Nov. 30, 1954     D. LEED ET AL     2,695,980

SERVOMECHANISM STABILIZATION

Filed April 12, 1951     2 Sheets-Sheet 1

INVENTORS: D. LEED
N. D. SMITH
BY
H. A. Burgess
ATTORNEY

Nov. 30, 1954
D. LEED ET AL
2,695,980
SERVOMECHANISM STABILIZATION
Filed April 12, 1951
2 Sheets-Sheet 2
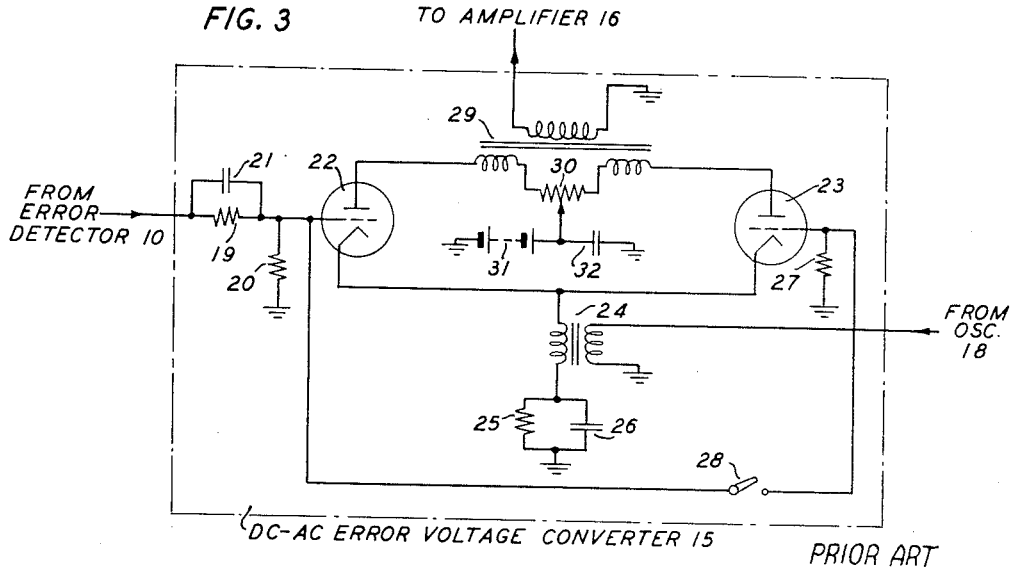
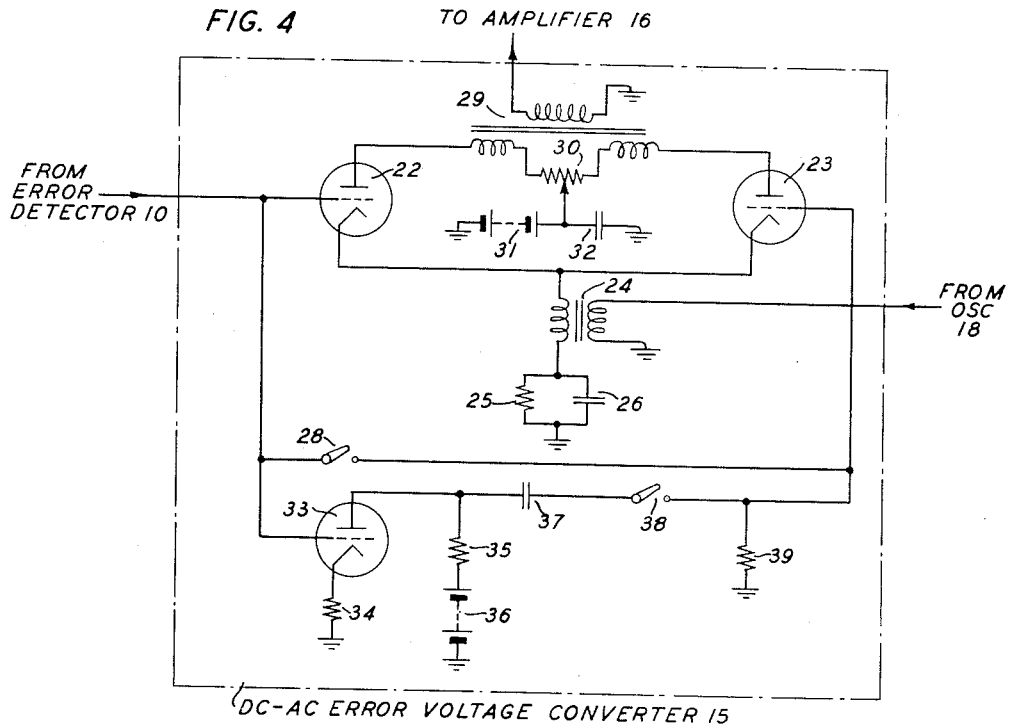
INVENTORS: D. LEED
N. D. SMITH
BY
*H. A. Burgess*
ATTORNEY

United States Patent Office 2,695,980
Patented Nov. 30, 1954

2,695,980

SERVOMECHANISM STABILIZATION

Daniel Leed and Norman D. Smith, New York, N. Y., assignors to Bell Telephone Laboratories, Incorporated, New York, N. Y., a corporation of New York Application April 12, 1951, Serial No. 220,570

13 Claims. (Cl. 318—30)

This invention relates generally to servo-mechanisms and more particularly to servo-mechanisms of the type in which the error of the controlled quantity is manifested as a direct voltage.

According to a commonly accepted definition, a servo-mechanism is a power amplifying device in which the amplifying element driving the output is actuated by the difference between the input and the output. The term "error" is normally used to represent the difference between the servo-input and output.

"Velocity lag error" is, in servo nomenclature, understood to mean the error of the servo-output caused by an input which is changing uniformly with time, while "static error" is the error which prevails when the servo-input is not changing with respect to time.

In a typical control servo, an electric motor is used as the amplifying or power supplying element and its output, or a quantity controlled by its output, is compared with the servo-input. A suitable detector supplies a voltage function of the error to the servo-motor through a control circuit or loop in the form of an electric current. The motor is actuated by the error signal and it operates in a direction to remove the difference between the servo-output and the servo-input.

In the design of a servo-mechanism for fast response, large amounts of gain are generally provided in the servo-control loop. This often leads to oscillation because of the energy storage in the moving masses of the control loop. This tendency toward instability is commonly overcome by arranging the control loop so that the control current supplied to the servo-motor is proportional, not only to the error of the mechanism, but also to selected time functions of the error. One of the normally used techniques is to energize the motor by a signal which is proportional to the error plus its time derivative. The time derivative factor increases the loop damping without increasing the velocity lag error, and permits large values of loop gain to be used before the onset of excessive overshoot, or sustained oscillation.

An analog to the modification of the servo-response by derivative control lies in the phenomenon of "eddy current" braking. For example, when the terminals of a direct-current meter are short-circuited, the deflections of the pointer due to fast mechanical displacements of the meter are very much reduced. As is well known, the reason for this is that the motion of the meter coil in the field of the magnet induces a current in the coil proportional to the rate of change, or time derivative, of its angular position, and the field of this current interacts with the magnet field to resist motion of the coil. The use of derivative stabilization in a servo-mechanism has a somewhat similar effect, in introducing a braking action that inhibits "hunting."

In the past, derivative control in a servo-mechanism has generally been secured by means of an electrical "phase lead" network incorporated into the servo-control loop. Such networks, however, generally include a series resistance which has the effect of attenuating the error signal, attenuating most strongly its low frequency components. Alternating-current servo-motors are usually used when power requirements are small and, when the error detector provides an error signal which is in the form of a direct voltage, a converter is employed to transform the error signal and its derived components into an alternating voltage. As the phase lead network precedes the converter, its direct-current attenuation results in a considerable magnification of any static error caused by converter drift. In addition, such attenuation frequently necessitates increasing the subsequent alternating-current amplification of the converter output to make up for such loss. The introduction of direct-current amplification between the phase lead network and the converter to compensate for the network loss is impractical, because the identical sources of instability responsible for converter drift render it exceedingly difficult to construct a direct-current amplifier with sufficient freedom from drift.

A principal object of the present invention is to avoid enhancement of the error caused by converter drift in a servo-system stabilized by derivative control.

A related object is to avoid the necessity of increasing the alternating-current amplification of the converter output to make up for direct-current loss in the portion of the servo-loop preceding the converter input.

Another object is to provide an additional degree of freedom in the derivative stabilization of a servo-system, making it possible to vary the derivative component of the error signal injected into the servo-loop without varying the proportional component.

In accordance with the present invention, derivative stabilization of a servo-mechanism is secured by deriving the proportional and the derivative components of the error signal separately and injecting them individually into the servo-control loop. The phase lead network of the prior art is eliminated and, since the attenuation occasioned by it is absent, the error of the controlled quantity caused by converter drift is no greater when derivative stabilization is used than when only proportional control is present. The elimination of loss in the portion of the servo-control loop preceding the converter also eliminates any necessity of increasing the alternating-current amplification of the converter output.

In one embodiment of the present invention, a double triode type converter is used to transform the direct-current error signal into an appropriate alternating-current signal for application to the servo-motor. Both grids of the converter are used as signal grids, with the proportional component of the direct-current error signal applied to one and the derivative component applied to the other. The converter thus assumes a second function, acting both as a direct-current to alternating-current transducer and as a mixer to add the effects of the two components on the converter output.

A more complete understanding of the invention may be secured by a study of the following detailed description. In the drawings:

Fig. 3 shows an error voltage converter of the type known in the prior art; and

Fig. 4 shows an error voltage converter which, when incorporated into the servo-system of Fig. 1, constitutes an embodiment of the present invention.

Figure 1:
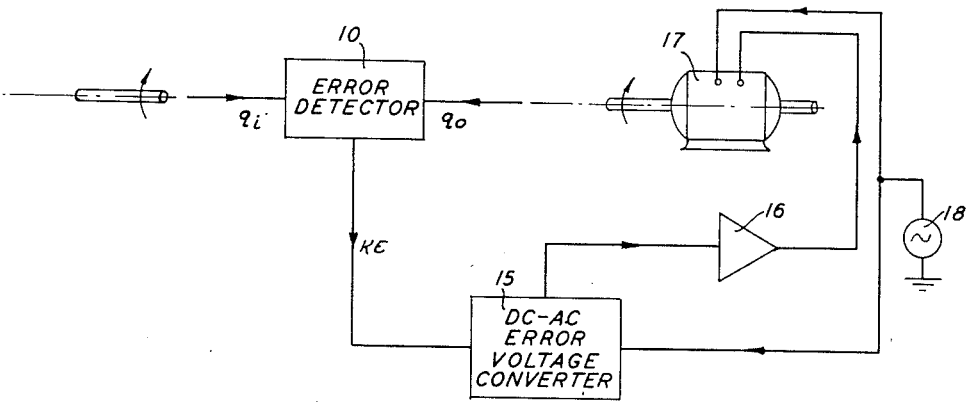
Fig. 1 is a block diagram representing a generalized servo-mechanism of the type under discussion.

The servo-mechanism illustrated in Fig. 1 is typical of the class of servo in which the error of the controlled quantity is manifested as a direct voltage. Many of the servos used in military equipment during World War II, for example, are in this category. In Fig. 1, the quantity being regulated is designated $q_0$ and the servo is expected to maintain equality between $q_0$ and the input or reference quantity $q_1$. $q_1$ and $q_0$ are of the same units and may be the angle of a shaft, temperature, velocity, frequency, wire tension in a coil winding machine, the pH of a chemical solution, or any other parameter for which a transducer exists that will convert changes of the parameter to changes of direct voltage. In Fig. 1 the controlled or output quantity $q_0$ and the reference or input quantity $q_1$ are both applied to a suitable error detector 10, which serves to detect any error $\epsilon$ and to produce a direct voltage $K\epsilon$ which is substantially proportional to any difference between the two quantities. If, for example, the servo-mechanism shown is a shaft angle control servo, $\epsilon$ is the difference between the reference and controlled shaft angle portions.

Figure 2:
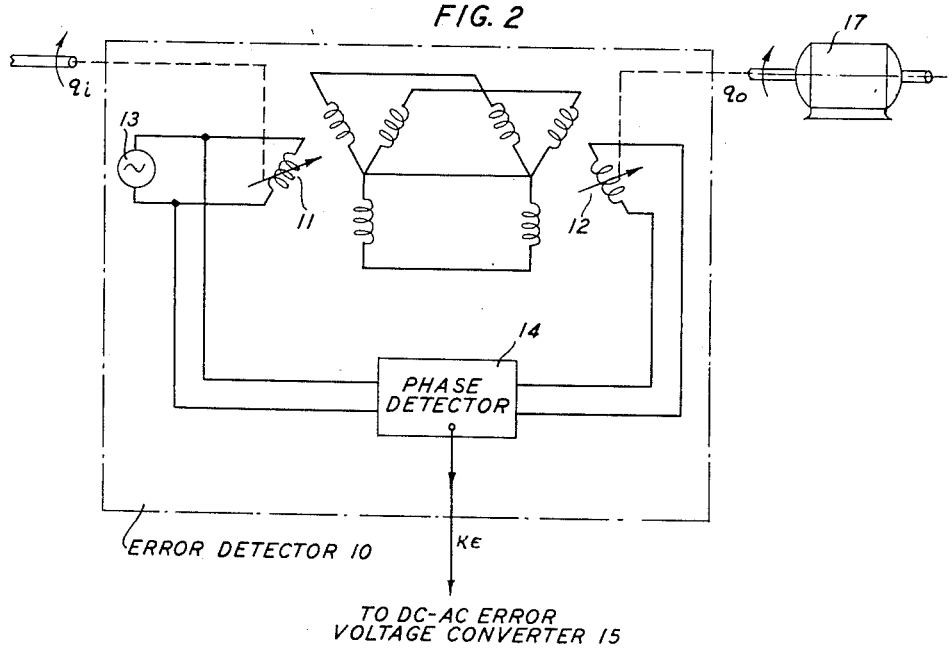
Fig. 2 shows an error detector which may be used in the servo-system of Fig. 1.

Error detector 10 may, by way of example, comprise the synchro pair and phase detector shown in Fig. 2.

The rotor of one synchro 11 is mechanically coupled to the input or reference shaft, while the rotor of another synchro 12 is similarly coupled to the output shaft of the servo. An oscillator 13 energizes the rotor of synchro 11. When a difference of angle develops between input and output shafts, the resultant difference of phase between the rotor voltages of the synchros is transformed to a direct voltage by a phase detector 14. The phase detector 14 may be any one of a number of suitable types known in the art. For example, a sum and difference type of detector, as employed in PPI (plan position indicator) servos of the type described in detail on pages 471 through 475 of "Electronic Instruments" by Greenwood, Holdam and MacRae, published in 1948 by McGraw-Hill as volume 21 of the Massachusetts Institute of Technology Radiation Laboratory Series, could readily be employed. The output from error detector 10 is then a direct voltage, $K\epsilon$, linearly proportional to the error of angle $\epsilon$ between input and output shafts.

Because of well-known difficulties associated with direct-current amplification and the brush problem in direct-current motors, the servo employs an error voltage converter 15 to transform the direct error voltage from error detector 10 into an alternating voltage which is then amplified by an alternating-current amplifier 16. The current output of amplifier 16 energizes the control phase of an induction motor 17, the fixed phase of which is energized from a source of 60-cycle carrier current 18. Oscillator 18 also supplies carrier current to the error voltage converter 15. When energized, the shaft of the servo-motor 17 turns in a direction to restore equality between the controlled and reference quantities of $q_0$ and $q_1$. When equality is achieved the error signal vanishes and the control phase of servo-motor 17 is no longer energized.

An error voltage converter of the type known in the art is shown in Fig. 3. For stabilization purposes a phase lead network is provided in the input circuit of the converter. The voltage $K\epsilon$ from error detector 10 in Fig. 1 is applied to a network compricing two resistors 19 and 20 and a condenser 21. Resistor 19 is in series in the input lead and is shunted by condenser 21 while resistor 20 is connected between the end of resistor 19 away from error detector 10 and ground. When this network is properly proportioned its output is approximately $$K_1\epsilon + K_2 \frac{d\epsilon}{dt}$$

The derivative component is obtained from the action of condenser 21 working against the resistance of resistor 20, and the component directly proportional to error is obtained from the straight divider action of resistors 19 and 20. To obtain a sufficiently close approximation to the above voltage transformation, it is necessary that the resistance of resistor 19 be large in comparison with that of resistor 20. In practice, the resistance of resistor 19 is generally at least ten times larger than that of resistor 20.

The converter itself is a double triode type converter made up of triodes 22 and 23, which may, for example, be the two halves of a twin triode tube. The cathodes of the two triodes 22 and 23 are connected together and to one side of the secondary winding of a transformer 24. A cathode resistor 25 and a by-pass condenser 26 are connected in parallel between the other side of the secondary winding of transformer 24 and ground. The primary winding of transformer 24 is supplied with 60-cycle carrier current from oscillator 18 in Fig. 1.

The output of the phase lead network is applied directly to the grid of triode 22, while the grid of triode 23 is connected to ground through a resistor 27. The grids in tubes 22 and 23 may be connected directly together through a balancing switch 28, which is normally open.

The divided primary windings of a transformer 29 are connected in series between the plates of the two triodes 22 and 23, with the resistance of a rheostat 30 connected between the individual windings. The secondary winding of transformer 29 is connected to alternating-current amplifier 16 of Fig. 1, while the movable contact of rheostat 30 is connected to ground through a plate supply source 31 which is, in turn, by-passed by a condenser 32.

When the converter shown in Fig. 3 is supplied with 60-cycle carrier current in the cathode circuit, a direct-current modulated carrier is developed across the secondary of transformer 29. The value of the alternating voltage across the secondary of transformer 29 depends upon the difference between the 60-cycle currents in each half of the transformer primary. When these are exactly equal the net alternating-current magnetization of the transformer core is zero and the output voltage across the secondary is zero. With unequal currents in the primary halves, an output voltage is obtained the phase of which, relative to the oscillator 18, is dependent upon the sense of the current unbalance. In other words, if output of $\theta$ degrees is obtained when the alternating plate current in tube 22 is greater than that in tube 23, output of $\theta \pm 180$ degrees is obtained when the plate current in tube 23 is greater than that in tube 22, the choice of sign depending upon the sense of the mutual coupling between the primary and secondary windings of transformer 29.

To balance the converter the two grids are connected together by the balancing switch 28 and the differential resistance between the meshes associated with the respective tubes is adjusted by the rheostat 30 until the output voltage is zero. This adjustment compensates for the residual amplification factor and plate resistance unbalance between the two tubes. The balancing switch 28 is then opened and the servo operates to maintain the same potential at the grid of triode 22 that existed at both grids during the balancing adjustment. It will seek continually to establish this relation as long as the initial residual unbalance of the two triodes remains constant. However, it is well known that as the tubes age the residual unbalance may shift somewhat, and the value of voltage on the grid of tube 22 to obtain null alternating-current output will not continnue to be zero.

For example, after a day of constant operation, the new value of direct voltage to obtain null alternating current may be 10 millivolts. This means that the servo no longer maintains equal reference and controlled shaft angles, but an inequality of angle large enough to result in .01 volt direct current at the converter grid. With the ten to one direct-current stepdown in the phase lead network, it is necessary to develop an error of angle sufficient to produce ten times .01 volt, or .1 volt, at the input to the phase lead network in order that .01 volt will exist at the converter. Hence, relative to the quantity controlled, the stabilization network magnifies, by a factor of ten, the error caused by drift of the converter.

In a servo designed for very precise tracking of controlled and reference quantities, the error magnification due to direct-current attenuation of the stabilizing network may be of very considerable concern. The present invention permits the injection of derivative voltage into the servo-control loop without magnification of the converter drift error.

One embodiment of the present invention comprises the servo-system illustrated in Fig. 1, with the circuit of Fig. 4 used as the error voltage converter 15. The basic circuit in Fig. 4 is the same as the converter shown in Fig. 3 in many respects. However, the phase lead network is absent, and a vacuum tube circuit is connected between the grids of tubes 22 and 23.

In Fig. 4, the grid of tube 22 is connected directly to the grid of a triode 33. The cathode of tube 33 is connected to ground through a cathode resistor 34, and a plate resistor 35 is connected in series with a plate supply source 36 between the plate of tube 33 and ground. Blocking condenser 37 couples the plate of tube 33 to the grid of tube 23 when a switch 38 is closed, while a resistor 39 is connected between the grid of tube 23 and ground. Switch 38 is not essential to the operation, but has been inserted in the lead between condenser 37 and resistor 39 to facilitate explanation.

When switch 38 is open, it is readily recognized that tubes 22 and 23 and the associated circuit constitute a dual triode error converter of the type shown in Fig. 3, with the exception that no phase lead network is present. The error voltage appears between the grid of tube 22 and ground, and the alternating-current output from transformer 29 has an envelope and phase determined by the error voltage.

Now consider switch 38 to be closed. Tube 33 amplifies the error voltage, and the amplified voltage appears across resistor 35. Condenser 37 and resistor 39 are proportioned so that the voltage across resistor 39 is proportional to the time derivative of the voltage across resistor 35. In a practical case, the resistance of resistor 35 is made small in comparison with that of resistor 39 so that the plate load of the tube 33 is substantially resistive and the tube introduces a phase shift of 180 degrees. The derivative voltage at resistor 39 is, therefore, 180 degrees out of phase with the derivative of the error voltage coming from error detector 10. However, a derivative component of such phase is exactly right to apply to the grid of tube 23 of the converter to achieve the same modification of the envelope and phase of the alternating-current converter output as would result from placing the derivative of the error voltage itself on the grid of tube 22.

Thus, in accordance with the present invention, both grids of the converter are use as signal grids. Proportional and derivative components are separated and injected individually into the servo-loop. The converter then assumes a second function, that of a mixer adding the two components in their effect on the converter output. Hence, the direct-current attenuation of a composite phase lead network preceding the converter input is absent and the error of the controlled quantity due to converter drift is no greater when derivative stabilization is used than when only proportional control is present. In addition, the absence of direct-current attenuation eliminates any need to increase the alternating-current amplification of the converter output to make up for such loss. Further, the circuit provides another degree of freedom, making it possible to vary the amount of derivative voltage injected into the loop by regulating the gain of triode 33. It is often advantageous to do this, since an optimum amount of derivative injection exists for a given servo, and one may determine this empirically by varying the gain of tube 33, with no reaction whatsoever on the proportional component at the grid of tube 22.

Separation of the proportional component from the derivative component of the error and the independent introduction of these components in the control loop by utilizing both converter grids simplifies the problem of obtaining pure derived functions. For example, the differentiating network in Fig. 4, comprising condenser 37 and resistance 39 provides purer derivative output than is obtainable from a phase lead network which is required to deliver a proportional as well as derivative component. Furthermore, the invention is not limited to the introduction of derivative stabilization by a simple differentiating circuit. More complex functions of the error may be injected, or special shaping of the frequency characteristic of the loop is possible, by the technique of utilizing both converter grids for signal purposes.

It is to be understood that the above-described arrangement is illustrative of the application of the principles of the invention. Numerous other arrangements may be devised by those skilled in the art without departing from the spirit and scope of the invention.

What is claimed is:

1. A servo-system for maintaining a predetermined relation between a controlled quantity and a reference quantity which comprises means to regulate the controlled quantity, means to detect any departure of the controlled and reference quantities from said predetermined relation, means to transform the error into a corresponding direct-current signal, circuit means to derive simultaneously and continuously but separately from said signal at least two components representing time functions thereof, and circuit means to actuate said regulating means under the continuous control of the combined effect of said components to eliminate the departure of the controlled and reference quantities from said predetermined relation.

2. A servo-system for maintaining a predetermined relation between a controlled quantity and a reference quantity which comprises a servo-motor for regulating the controlled quantity, means to detect any departure of the controlled and reference quantities from said predetermined relation, means to transform the error into a corresponding direct-current signal, circuit means to derive simultaneously and continuously but separately from said signal at least two time functions thereof, and circuit means to actuate said servo-motor under the continuous control of the combined effect of said time function signals to eliminate the departure of the controlled and reference quantities from said predetermined relation.

3. A servo-system for maintaining a predetermined relation between a controlled quantity and a reference quantity which comprises a servo-motor for regulating the controlled quantity, means to detect any departure of the controlled and reference quantities from said predetermined relation, means to transform the error into a corresponding direct-current signal, circuit means to derive simultaneously and continuously but separately from said signal a component proportional thereto and a component corresponding to the time derivative thereof, and circuit means to actuate said servo-motor under the continuous control of the combined effect of said components to eliminate the departure of the controlled and reference quantities from said predetermined relation.

4. A servo-system for maintaining a predetermined relation between a controlled quantity and a reference quantity which comprises an alternating-current servo-motor for regulating the controlled quantity, means to detect any departure of the controlled and reference quantities from said predetermined relation, means to transform the error into a corresponding direct-current signal, circuit means to derive simultaneously and continuously but separately from said signal at least two components representing time functions thereof, a converter to modulate an alternating-current carrier voltage continuously under the simultaneous control of both of said derived signal components, and circuit means to actuate said servo-motor under the control of the modulated carrier voltage output of said converter to eliminate the departure of the controlled and reference quantities from said predetermined relation.

5. A servo-system for maintaining a predetermined relation between a controlled quantity and a reference quantity which comprises an alternating-current servo-motor for regulating the controlled quantity, means to detect any departure of the controlled and reference quantities from said predetermined relation, means to transform the error into a corresponding direct-current signal, circuit means to derive simultaneously and continuously but separately from said signal a component proportional thereto and a component corresponding to the time derivative thereof, a converter to modulate an alternating-current carrier voltage continuously under the simultaneous control of both of said derived signal components, and circuit means to actuate said servo-motor under the control of the modulated carrier voltage output of said converter to eliminate the departure of the controlled and reference quantities from said predetermined relation.

6. A servo-system for maintaining a predetermined relation between a controlled quantity and a reference quantity which comprises alternating-current actuated means to regulate the controlled quantity, means to detect any departure of the controlled and reference quantities from said predetermined relation, means to transform said departure into a corresponding direct-current signal, means to derive simultaneously and continuously but separately from said signal at least two selected time functions thereof, conversion means to transform said time functions simultaneously to a corresponding alternating voltage, said converter acting also as a mixer to add continuously the effects of said time functions on the converter output, and circuit means to energize said regulating means under control of the converter output to eliminate the departure of the controlled and reference quantities from said predetermined relation.

7. A servo-system for maintaining a predetermined relation between a controlled quantity and a reference quantity which comprises an alternating-current servo-motor for regulating the controlled quantity, means to detect any departure of the controlled and reference quantities from said predetermined relation, means to transform the error into a direct-current signal substantially proportional thereto, a converter to transform said signal into a form suitable for application to said servo-motor which comprises first and second amplifying devices each of which contains an anode, a cathode, and at least one control electrode, circuit means to supply an alternating-current carrier voltage to the common cathode circuit of said amplifying devices, circuit means to supply said signal directly to the control electrode of said first amplifying device, circuit means to derive a component of said signal corresponding to the time derivative thereof, circuit means to supply the derived component of said signal to the control electrode of said second amplifying device, and output circuit means to derive from the respective anode-cathode circuits of said amplifying devices a modulated alternating-current carrier voltage the amplitude and phase of which correspond to said signal combined with the time derivative thereof, and circuit means to supply the modulated carrier output voltage from said converter to said servo-motor to actuate said motor to eliminate the departure of the controlled and reference quantities from said predetermined relation.

8. A servo error voltage converter which comprises a modulator having two signal input circuits, a carrier input circuit, and a modulated carrier output circuit, circuit means to derive continuously from a direct-current signal a component substantially proportional thereto, circuit means to derive continuously and simultaneously from the same direct-current signal a component corresponding to the time derivative thereof, circuit means to apply said proportional component continuously to one of said input circuits, and circuit means to apply said derivative component continuously to the other of said input circuits.

9. A servo error voltage converter which comprises a modulator having two signal input circuits, a carrier input circuit, and a modulated carrier output circuit, circuit means to derive continuously from a direct-current signal a component substantially proportional thereto, circuit means including phase reversal means to derive continuously and simultaneously from the same direct-current signal a component corresponding to the time derivative thereof, circuit means to apply said proportional component continuously to one of said input circuits, and circuit means to apply said derivative component continuously to the other of said input circuits.

10. A servo error voltage converter for transforming a direct-current error signal into a form suitable for application to an alternating-current servo-motor which comprises first and second amplifying devices each of which contains an anode, a cathode, and at least one control electrode, circuit means to supply an alternating-current carrier voltage to the common cathode circuit of said amplifying devices, circuit means to supply the error signal directly to the control electrode of said first amplifying device, circuit means to derive a component of said signal corresponding to the time derivative thereof, circuit means to supply the derived component of said signal to the control electrode of said second amplifying device, and output circuit means to derive from the respective anode-cathode circuits of said amplifying devices a modulated alternating-current carrier voltage the amplitude and phase of which corresponds to said signal combined with the time derivative thereof.

11. A servo system for maintaining a predetermined relation between a controlled quantity and a reference quantity which comprises an alternating-current servomotor for regulating the controlled quantity, means to detect any departure of the controlled and reference quantities from said predetermined relation, means to transform the error into a direct-current signal substantially proportional thereto, a converter to transform said direct-current signal into a form suitable for application to said servomotor which comprises a modulator having two signal input circuits, a carrier input circuit, and a modulated carrier output circuit, circuit means to derive continuously from said direct-current signal a component substantially proportional thereto, circuit means to derive continuously and simultaneously from said same direct-current signal a component corresponding to the time derivative thereof, circuit means to apply said proportional component continuously to one of said input circuits, and circuit means to apply said derivative component continuously to the other of said input circuits, and circuit means to supply the modulated carrier output voltage from said converter to said servomotor to actuate said motor to eliminate the departure of the controlled and reference quantities from said predetermined relation.

12. A servo system for maintaining a predetermined relation between a controlled quantity and a reference quantity which comprises an alternating-current servomotor for regulating the controlled quantity, means to detect any departure of the controlled and reference quantities from said predetermined relation, means to transform the error into a direct-current signal substantially proportional thereto, a converter to transform said direct-current signal into a form suitable for application to said servo motor which comprises a modulator having two signal input circuits, a carrier input circuit, and a modulated carrier output circuit, circuit means to derive continuously from said direct-current signal a component substantially proportional thereto, circuit means including phase reversal means to derive continuously and simultaneously from said same direct-current signal a component corresponding to the time derivative thereof, circuit means to apply said proportional component continuously to one of said input circuits, and circuit means to apply said derivative component continuously to the other of said input circuits, and circuit means to supply the modulated carrier output voltage from said converter to said servomotor to actuate said motor to eliminate the departure of the controlled and reference quantities from said predetermined relation.

13. A servo system for maintaining a predetermined relation between a controlled quantity and a reference quantity which comprises an alternating-current servomotor for regulating the controlled quantity, means to detect any departure of the controlled and reference quantities from said predetermined relation, means to transform the error into a direct-current signal substantially proportional thereto, a converter to transform said direct-current signal into a form suitable for application to said servomotor which comprises first and second amplifying devices each of which contains an anode, a cathode, and at least one control electrode, circuit means to supply an alternating-current carrier voltage to the common cathode circuit of said amplifying devices, circuit means to supply said direct-current signal directly to the control electrode of said first amplifying device, circuit means including a resistor, a capacitor, and a third amplifying device which contains an anode, a cathode, and at least one control electrode to derive a component of said same direct-current signal corresponding to the time derivative thereof, the control electrode of said third amplifying device being connected to the control electrode of said first amplifying device, said capacitor being connected between the anode of said third amplifying device and the control electrode of said second amplifying device to supply the derivative component of said direct-current signal to said second amplifying device, and said resistor being connected between the control electrode of said second amplifying device and the cathode of said third amplifying device, and output circuit means to derive from the respective anode-cathode circuits of said first and second amplifying devices a modulated alternating-current carrier voltage the amplitude and phase of which correspond to said direct-current signal combined with the time derivative thereof, and circuit means to supply the modulated carrier output voltage from said converter to said servomotor to actuate said motor to eliminate the departure of the controlled and reference quantities from said predetermined relation.

References Cited in the file of this patent

UNITED STATES PATENTS

| Number | Name | Date |
| --- | --- | --- |
| 2,233,415 | Hull | Mar. 4, 1941 |
| 2,409,970 | Agins | Oct. 22, 1946 |
| 2,424,568 | Isbister et al. | July 29, 1947 |
| 2,446,188 | Miller | Aug. 3, 1948 |
| 2,447,321 | Ertzman | Aug. 17, 1948 |
| 2,518,161 | McNaney | Aug. 8, 1950 |
| 2,590,528 | Gilbert | Mar. 25, 1952 |